United States Patent
Niemi et al.

(10) Patent No.: US 8,767,677 B2
(45) Date of Patent: Jul. 1, 2014

(54) TRIGGERING LOCATION AREA UPDATE

(71) Applicant: Renesas Mobile Corporation, Tokyo (JP)

(72) Inventors: Marko Tapani Niemi, Oulu (FI); Hannu Petri Hietalahti, Kiviniemi (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/036,134

(22) Filed: Sep. 25, 2013

(65) Prior Publication Data

US 2014/0126536 A1    May 8, 2014

(30) Foreign Application Priority Data

Nov. 5, 2012    (GB) .................................. 1219862.8

(51) Int. Cl.
*H04W 4/00*        (2009.01)
(52) U.S. Cl.
USPC ........... 370/331; 370/338; 370/341; 370/342; 370/345
(58) Field of Classification Search
USPC ........................... 370/331, 338, 341, 342, 345
See application file for complete search history.

(56) References Cited

U.S. PATENT DOCUMENTS

| | | | |
|---|---|---|---|
| 8,244,244 B1 | 8/2012 | Hietalahti et al. | |
| 8,554,233 B2 * | 10/2013 | Long et al. | 455/445 |
| 2007/0232321 A1 * | 10/2007 | Casati et al. | 455/456.1 |
| 2010/0061331 A1 * | 3/2010 | Guo et al. | 370/329 |
| 2010/0120399 A1 * | 5/2010 | Guo et al. | 455/411 |
| 2011/0026484 A1 * | 2/2011 | Fox et al. | 370/331 |
| 2011/0256876 A1 | 10/2011 | Kim | |

FOREIGN PATENT DOCUMENTS

| | | |
|---|---|---|
| EP | 2 139 190 A1 | 12/2009 |
| GB | 2 435 152 A | 8/2007 |

OTHER PUBLICATIONS

UKIPO Combined Search and Examination Report under Sections 17 and 18(3) dated Mar. 28, 2013, which was issued in a related UK Application No. GB1219862.8 (5 pages).

"Location Updating Procedure," Sub-clause 4.4.1 of 3GPP TS 24.008 v11.4.0, Technical Specification, 3GPP Generation Partnership Project; Technical Specification Group Core Network and Terminals; Mobile radio interface Layer 3 specification; Core network protocols; Stage 3 (Release 11), Sep. 2012 (4 pages).

(Continued)

*Primary Examiner* — Brian D Nguyen
*Assistant Examiner* — Toan Nguyen
(74) *Attorney, Agent, or Firm* — Foley & Lardner LLP (57) ABSTRACT

When at user equipment UE transitions between radio access technology cells, at the transition a timer for controlling when the UE is to send a periodic location registration is reset. This avoids the UE being implicitly detached when it is unable/blocked in the packet-switched PS domain from performing a RAU but would be able to perform a LU, particularly when the UE is in PS/CS modes 1 or 2. Five different embodiments are detailed: the LU timer T3212 is reset with a value of time remaining in a tracking area update TAU timer T3412; T3212 is reset with an initial value for T3212; the RAU timer T3312 is reset with a value of time remaining in the TAU timer T3412; and the T3212 or T3312 reset is conditional on a value of time remaining in a PS backoff timer T3346 exceeding the value of time remaining in the TAU T3412.

18 Claims, 4 Drawing Sheets

(56) References Cited

OTHER PUBLICATIONS

Vodafone at al., "Deleting unnecessary trigger for initiating LAU procedure," 3GPP TSG-CT WG1 Meeting #67, C1-104064, Barcelona, Spain, Oct. 11-15, 2010 (3 pages).

Zte, "LAU trigger when T3412 expires with TIN=GUTI," 3GPP TSG CT WG1 Meeting #80, C1-123657, Prague, Czech Republic, Oct. 15-19, 2012 (3 pages).

Zte, "LAU trigger when T3412 expires with TIN=GUTI," 3GPP TSG CT WG1 Meeting #80, C1, 123658, Prague, Czech Republic, Oct. 15-19, 2012 (4 pages).

Zte, "LAU trigger when T3412 expires with TIN=GUTI," 3GPP TSG CT WG1 Meeting #80, C1-124029, Prague, Czech Republic, Oct. 15-19, 2012 (4 pages).

Zte, "LAU trigger when T3412 expires with TIN="GUTI,"" 3GPP TSG CT WG1 Meeting #80, C1-124030, Prague, Czech Republic, Oct. 15-19, 2012 (5 pages).

* cited by examiner

TRIGGERING LOCATION AREA UPDATE

CROSS REFERENCE TO RELATED APPLICATION

This application claims the benefit under 35 U.S.C. §119 (a) and 37 CFR §1.55 to UK Patent Application No. 1219862.8, filed on Nov. 5, 2012, the entire content of which is incorporated herein by reference.

TECHNICAL FIELD

The exemplary and non-limiting embodiments of this invention relate generally to wireless communication systems, methods, devices and computer programs and, more specifically, relate to location updating procedures and related timers when a user equipment moves from a cell in one radio access technology RAT to a cell in another RAT.

BACKGROUND

When a user equipment (UE) is roaming among multiple cells using different radio access technologies (RATs, such as for example GSM, UTRAN and E-UTRAN/LTE) with idle state signaling reduction (ISR), the UE needs to perform some type of location registration to indicate the UE's availability to the relevant network cell, which is necessary for the cell to be able to page the UE such as for an incoming call.

There are various specific types for this location registration. Location registration is the more generic term which for example can be satisfied via a Tracking Area Update (TAU), a Routing Area Update (RAU), a combined TAU and RAU in the packet switched (PS) domain, and via Location Updating (LU) in the circuit switched (CS) domain. Location registration of a UE moving between different Location Areas (LA), Routing Areas (RA) and Tracking areas (TA) is therefore necessary, and even periodic location updating is necessary when the UE is not actively mobile. These periodic location registrations are controlled by dedicated timers; timer T3212 for the periodic LU, timer T3312 for the periodic RAU, and timer T3412 for the periodic TAU. Any of these may be generalized as a periodic location registration (LR) timer.

A problem arises if the UE is unable to perform its specific location registration. This may occur for example if the UEs access to network is barred, or if the network rejects the request from the UE with its back-off timer already set. In either case the UE is not allowed to perform its periodic location registration at the expiry of the relevant periodic update timer. When for whatever reason the UE fails to perform its periodic location registration on time, then once the relevant periodic location registration timer and implicit detach timer expires in the network, the core network entity will consider the UE no longer reachable and the core network (CN) will implicitly detach the UE. At this point, the UE becomes un-reachable for mobile terminating (MT) calls.

Figure 1:
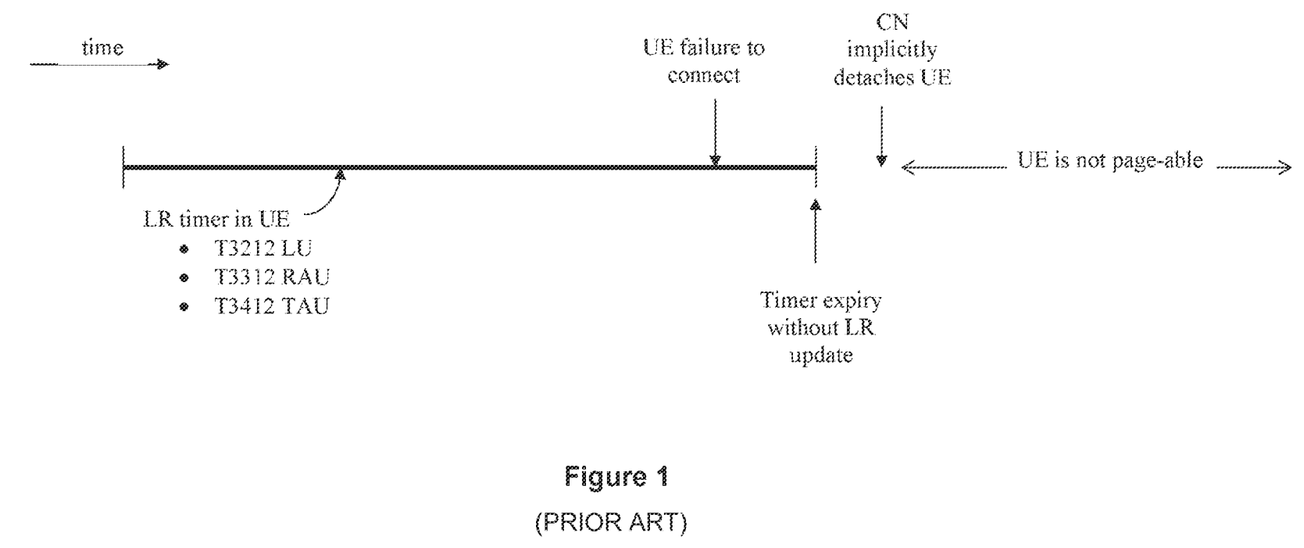
FIG. 1 is a timing diagram illustrating a problem that arises when a UE fails to provide its network with a location registration within the time allotted by a periodic location registration timer, and illustrates a problem that certain embodiments of these teachings can resolve.

The general concept is shown at the timing diagram of FIG. 1. While its controlling LR timer is running the UE attempts to connect to the network to report its location registration. The timer expires without a LR update from this UE. The network also runs a similar timer for this particular UE and recognizes that it has received no location registration when that timer expires. Once the core network recognizes this it assumes the UE is no longer available (e.g., it assumes the UE has powered down or is not within range of any cell), and from that point onwards if there is an incoming call to the UE the core network does not know how it should route the call. No cell attempts to page the UE because the time for the UE to update its location registration has passed without a periodic update from the UE.

SUMMARY

In a first exemplary aspect of the invention there is a method for controlling a wireless radio device. In this first aspect the method includes: determining that a user equipment is transitioning from a cell in a first radio access technology to a cell in a second radio access technology; and at the transition, resetting a timer for controlling when the user equipment is to send a periodic location registration.

In a second exemplary aspect of the invention there is an apparatus for controlling a wireless radio device. In this aspect the apparatus includes a processing system, and the processing system may include at least one processor and a memory storing a set of computer instructions. The processing system is configured to cause the apparatus at least to: determine that a user equipment is transitioning from a cell in a first radio access technology to a cell in a second radio access technology; and at the transition, reset a timer for controlling when the user equipment is to send a periodic location registration.

In a third exemplary aspect of the invention there is a computer readable memory tangibly storing a set of computer executable instructions for controlling a wireless network radio device. In this aspect the set of computer executable instructions includes: code for determining that a user equipment is transitioning from a cell in a first radio access technology to a cell in a second radio access technology; and code for resetting, at the transition, a timer for controlling when the user equipment is to send a periodic location registration.

These and other aspects are detailed below with more particularity.

DETAILED DESCRIPTION

The examples detailed herein are in the context of the LTE system and mobility with other RATs, but this is only to provide a practical context to describing the inventive concepts; these teachings may be utilized for mobility among other non-LTE RATs where location updates are required of the UE within a prescribed time.

The problem outlined above has been previously recognized, but perhaps not adequately resolved. One attempt to address this issue is set forth in detail for 3GPP Release 10 at document C1-104064 entitled Change Request 24.0008 CR rev 1 [3GPP TSG-CT WG1 Meeting #67; Barcelona, Spain; 11-15 Oct. 2010], which removes the location update trigger when a CS/PS mode UE that has registered to the LTE network with ISR deactivated state and then the UE moves to a 2G/3G cell in Network Mode of Operation II (NMO II) and the same location area identity (LAI) of the stored location area. The reason is that MME will locally detach the UE after context transfer with the serving GPRS support node (SGSN) in the core network, and not send any explicit evolved packet system (EPS) detach indication to the visitor location register (VLR). If there is a mobile terminated CS page, the VLR will send the page to the mobility management entity (MME), which will receive a reject message and retry the page on the A/Iu-CS interface. This will cover the UE reachability in 2G/3G as long as the UE can perform its normal RAU/LU procedures.

The above approach above does not work properly if the UE moves to a 2G/3G domain which has PS domain barred or PS domain backed off when the RAU is rejected, since the UE's context will not be transferred from the MME. If there is no context transfer between the MME and the new SGSN, the MME will eventually timeout and send a detach indication to the VLR, after which no more mobile terminated paging is possible. This timeout is guarded by the remaining periodic TAU timer T3412. For the duration of timer T3412 the UE will be page-able, but after the expiry of that T3412 timer the network will, after the expiry of its implicit detach timer, detach the UE locally and consider it non-page-able.

Further details of the above summary can be seen at document C1-123657 by ZTE entitled LAU trigger when T3412 expires with TIN=GUTI, and also at document C1-123658 entitled Change Request 24.0008 CR 2258 [both from 3GPP TSG CT WG1 Meeting #80; Prague, Czech Republic; 15-19 Oct. 2012]. These further documents propose that the periodic location update in the CS domain be controlled by timer T3412, which is the periodic update timer of another protocol, given by the MME and not the serving mobile switching center (MSC)/VLR.

The UE must somehow gain the knowledge that it must perform a periodic LU if the RAU in this situation has been blocked due to barring, back-off timer, or for some other reason. But the problem in this solution is that the mobility management (MM) layer in the UE needs to follow timer T3412 to trigger location update procedure. The timer T3412 is the EPS mobility management (EMM) periodic tracking area update timer, and is in the PS domain/EPS.

In 3GPP TSG CT WG1 Meeting #80 [Prague, Czech Republic; 15-19 Oct. 2012] it was agreed to add a LAU trigger when a CS/PS mode UE in a 2G/3G cell and the same LAI of the stored location area [see documents C1-124029 and C1-124030 from that same meeting, both of which are Change Requests]. But the TIN (the RAT-related temporary mobile subscriber identity/number) is still "GUTI" (meaning the ISR is deactivated) when timer T3412 expires, or when UE enters the 2G/3G NMO II and T3412 has expired. This makes sure the UE will register at the CS domain before the MME's implicit EPS detach, and the VLR will not mark UE as detached.

One final note for a fuller context for the below teachings; sub-clause 4.4.1 of 3GPP TS 24.0008 V 11.4.0 (2012-09) states the following about using timer T3412 as the LU trigger (but note that the PS domain functions are not prevented):

b) if the MS is configured to use CS fallback and SMS over SGs, or SMS over SGs only, and the TIN indicates "RAT-related TMSI", when the periodic tracking area update timer T3412 expires and the network operates in network operation mode II or III; or when the MS enters a GERAN or UTRAN cell in network operation mode II or III and the E-UTRAN deactivate ISR timer T3423 is running.

Figure 2:
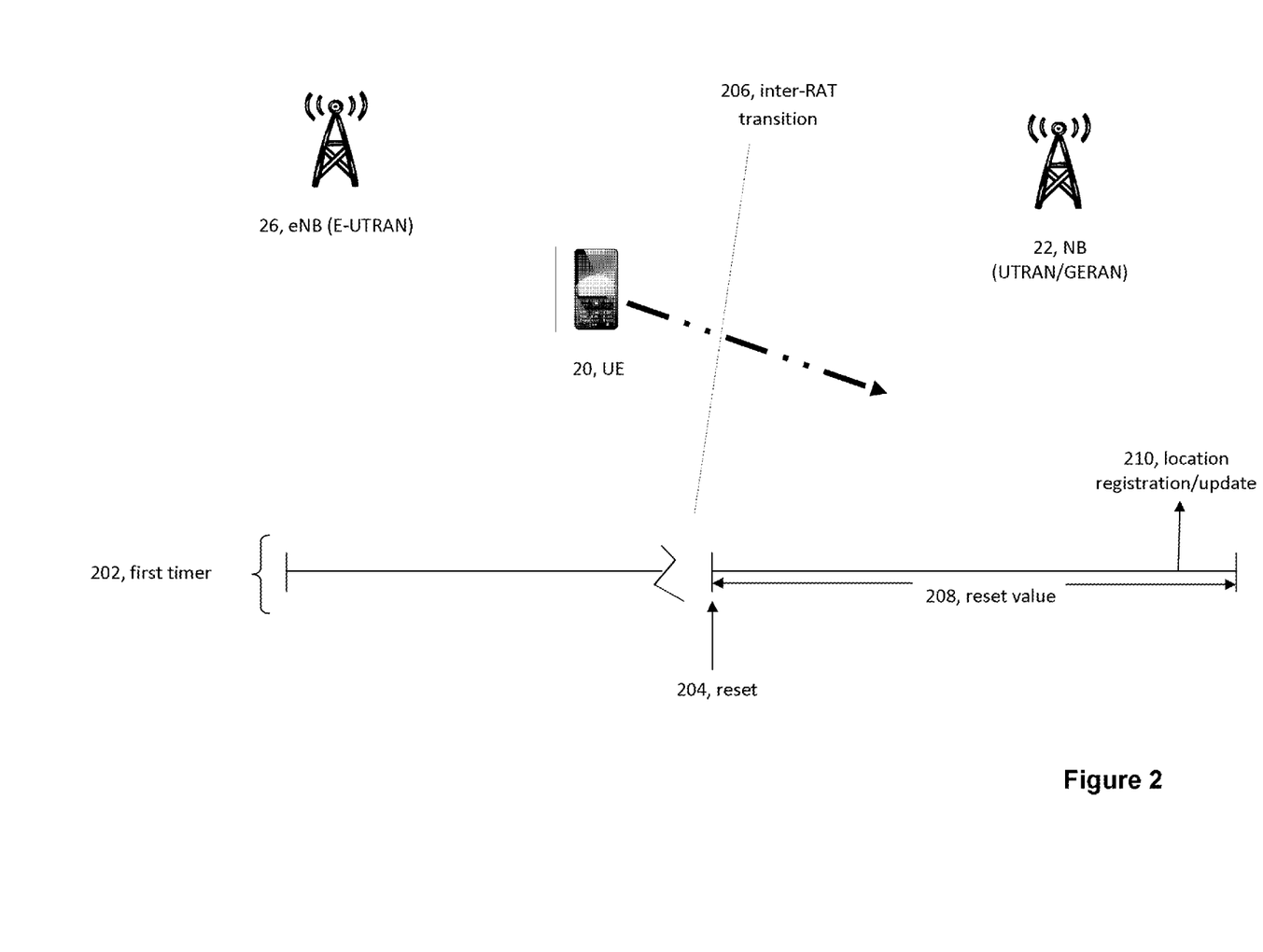
FIG. 2 is a schematic diagram of a user equipment transitioning from an E-UTRAN cell to a GERAN or UTRAN cell and operation of a timer for location updates/registrations, and is an advantageous radio environment in which embodiments of these teachings may be practices to advantage.

FIG. 2 is a schematic diagram of a user equipment UE 20 transitioning from a cell in a first RAT which is E-UTRAN (evolved Universal Terrestrial Radio Access Network) to a cell of a second RAT which is GERAN (GSM/EDGE Radio Access Network) or UTRAN (Universal Terrestrial Radio Access Network). For completeness there is shown an eNB 26 as the access node controlling the E-UTRAN cell and a NB 22 as the access node controlling the UTRAN cell. The UE 20 makes the inter-RAT transition at roughly the line 206.

At the lower portion of FIG. 2 is the UE's timer 202 which is reset according to these teachings. Note that both the UE 20 and the network (whether the core network or the NB 22) will be running identical timers for this UE for the UE to know when it must send a location registration/update and the network to know when it must receive such an update from that UE 20 before considering the UE not page-able. Prior to the inter-RAT transition 202 the UE may be running this timer 202 conventionally, or not at all since in some embodiments there may be another periodic timer controlling the UE's behavior while it is operating in the first RAT, different from the timer 202 that is reset at the transition 206. If the same timer 202 is used prior to the transition 206 its value is dumped and the timer 202 is reset 204 at the UE's inter-RAT transition 206.

More specifically for the case when the UE in CS/PS mode 1 or CS/PS mode 2 is moving from a LTE-E-UTRAN cell to a GERAN/UTRAN cell, and the PS domain RAU procedures are prevented (for example is unable to send its RAU on time due to the PS domain being barred or the UE is backed off from the PS domain), at the inter-system change the UE starts timer T3212 (which is the mobility management/MM periodic update timer) with the remaining value of timer T3412 (which is the PRS mobility management/EMM periodic update timer). The CS/PS mode 1 and mode 2 mean the UE is CS fallback capable, and is configured to use CS fallback, and is registered to both EPS and non-EPS services. For PS/CS mode 1 the non-EPS services are preferred, whereas for PS/CS mode 2 the EPS services are preferred.

From that point onwards, the UE may continue with all of the conventional periodic location update procedures, after the periodic location update timer T3212 that has been primed with this more accurate prediction of the safe remaining timer for the next location registration before the UE will be implicitly detached by the core network (and thus by its NB access node in the new GERAN/UTRAN cell). In this case and unlike some of the other possible solutions in the documents mentioned above, the UE does not need to perform any additional location updates "just in case" in order to remain page-able, and also the UE does not get implicitly detached.

Figure 3:
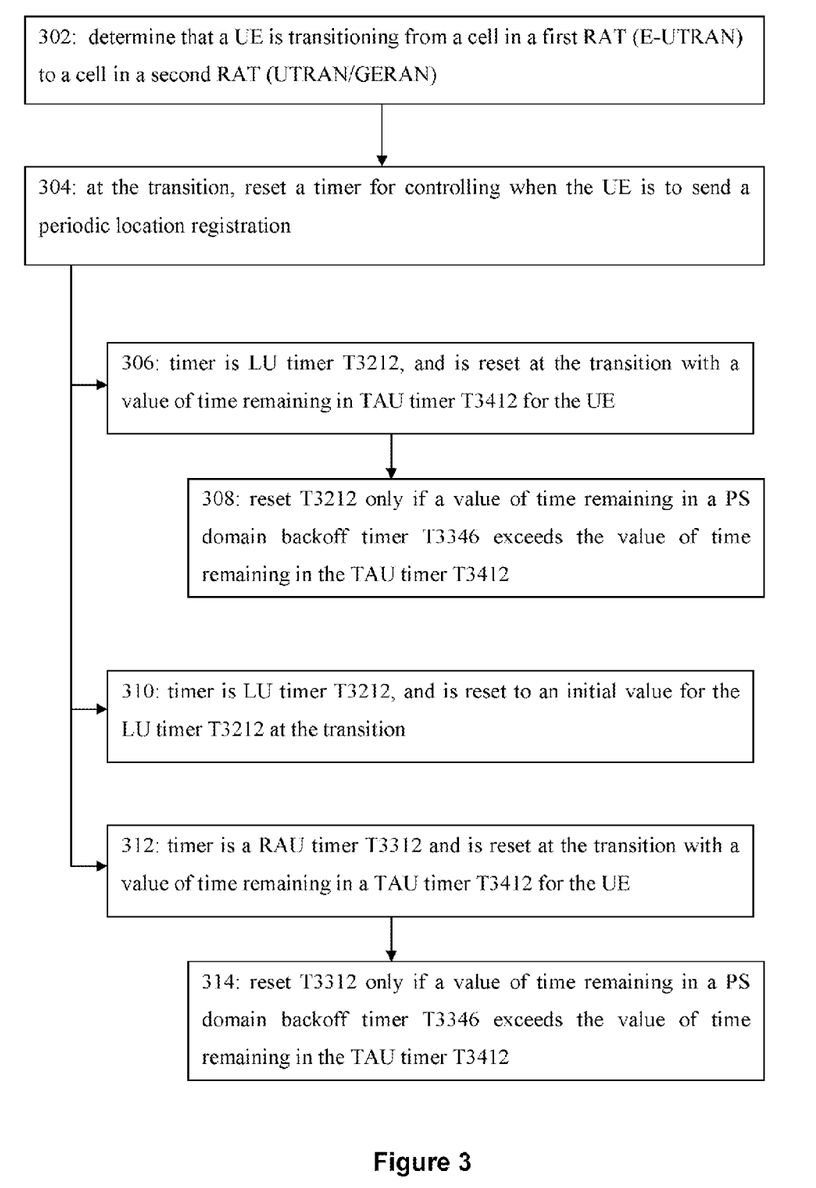
FIG. 3 is a logic flow diagram that illustrates a method for operating an electronic wireless radio device such as for example the NB or UE in FIG. 2, and a result of execution by an apparatus of a set of computer program instructions embodied on a computer readable memory for operating such a radio device, in accordance with certain exemplary embodiments of this invention.

FIG. 3 presents a summary of these teachings from the perspective of the UE and of the network access node, since each keeps a timer for the same UE. In that regard the steps shown at FIG. 3 may be considered steps or actions for controlling and for operating a wireless radio device, where the device in one instance may be the UE and in another instance it may be a wireless network access node such as for example a NB operating in a GERAN or UTRAN network. At block 302 the wireless radio device (or one or more components controlling the device) determines that a user equipment is transitioning from a cell in a first radio access technology to a cell in a second radio access technology; and then at block 304 and at that transition, it resets a timer for controlling when the user equipment is to send a periodic location registration.

After the timer is reset at FIG. 3 and prior to expiry of that reset timer, the UE will normally send to the access node/cell in the second radio access technology a periodic location update (in place of the RAU which is blocked in the PS domain for this UE), and the access node will receive it prior to expiry of that timer thus assuring the UE remains page-able and is not implicitly detached.

Below are detailed five distinct embodiments, in three the timer that is reset at block 304 is location update timer T3212 which is the one noted in the example above but in the fourth and fifth the timer is the routing area update timer T3312. Recall that in the specific case where the first radio access technology is E-UTRAN and the second radio access technology is UTRAN or GERAN, the user equipment is in circuit-switched/packet-switched modes 1 or 2. In this case the resetting of the timer at block 304 is conditional on a routing area update RAU procedure being blocked for the user equipment in a packet-switched domain. These are specific but non-limiting embodiments.

In a first distinct embodiment, with certain conditions when the PS domain procedures are not permitted and the UE moves from EUTRAN to GERAN/UTRAN, the UE must start CS MM specific periodic location update timer T3212 with the remaining value of the MME periodic TAU timer T3412. This implementation for the resetting at block 304 of FIG. 3 is conveniently summarized at block 306, where the timer is a location update timer T3212 and is reset at the transition with a value of time remaining in a tracking area update timer T3412 for the user equipment. T3412 is specified for the individual UE that made the inter-RAT transition at 206 of FIG. 2 because from the network's perspective it may be running LU and/or TAU timers for several UEs.

In a second distinct embodiment which is a more detailed implementation of the first, the remaining value of the PS back-off timer value T3346 should be taken into account before T3212 is started/re-set. In this case it is beneficial to start timer T3212 only if the remaining value of timer T3346 is larger/longer than the remaining value of T3412. This is because if timer T3346 would expire before T3412 would expire, then the UE will be permitted to make normal routing update procedures also in the PS domain and the exceptional procedure of block 304/306 to perform a location update would not be needed.

If the back-off timer T3346 is substantially longer than the periodic TAU timer T3412, then the UE will lose its page-ability also for CS domain services even when barring or congestion affects the PS domain only. In that situation it would be useful to start T3212 with the remaining value of T3412. This second embodiment gives the same outcome as the first embodiment, but with more optimization of the timer handling because the starting of timer T3212 is avoided when it is known to be not necessary.

This second embodiment is summarized at block 308: the resetting of the location update timer T3212 is conditional on a value of time remaining in a packet-switched domain back-off timer T3346 exceeding the value of time remaining in the tracking area update timer T3412.

In a third distinct embodiment, the location update timer T3212 is reset in its initial value and started. This implementation for the resetting at block 304 of FIG. 3 is conveniently summarized at block 310; as for the first and second embodiments above the first timer in this third embodiment is also the location update timer T3212, but for this third embodiment that timer is reset to an initial value for the location update timer T3212 at the transition. That is, the timer 3212 is re-set at the transition 306 with its full LU period and any elapsed time prior to the inter-RAT transition is dumped. Because it is possible in this case that the UE may lose its paging messages if the gap between T3412 and T3212 is significant, the first and second embodiments are seen to be more robust solutions than this third embodiment.

In a fourth distinct embodiment, the timer that is reset in block 304 is not the LU timer T3212 but instead is the RAU timer T3312, which is started at the inter-RAT transition with the remaining value of the TAU timer T3412. This embodiment is seen to be the simplest to adopt into existing infrastructure since resetting the timer T3312 in this manner enables the UE to use the conventional procedures specified in 3GPP TS 24.0008 (cited above). Specifically, the procedures specified in 3GPP TIS 24.008 where the timer T3312 already triggers a location update procedure in conventional practice (with certain conditions) is re-used for this inter-RAT transition purpose and need not be adapted further, according to an implementation of this fourth embodiment. Or alternatively, another implementation of this fourth embodiment re-uses an already existing fallback procedure where the UE in certain circumstances is unable (more precisely the UE is not allowed) to perform a routing area update RAU and so will instead perform a location update.

This fourth embodiment is summarized at block 312, where the timer is a routing area update timer T3312 and is reset at the transition with a value of time remaining in a tracking area update timer T3412 for the user equipment.

The fifth embodiment is similar in concept to the second except that it is a more optimized implementation for handling the RAU timer T3312 of the fourth embodiment. The UE and the network check the remaining value of the PS back-off timer value T3346 and only if the remaining value of the back-off timer T3346 is larger/longer than the remaining value of the RAU timer T3312 will they follow block 312 of FIG. 3 and reset the RAU timer 3312 with the remaining value of the TAU T3412. The reasoning is similar as detailed above; if the back-off timer T3346 would expire before the RAU timer T3312 would expire, the UE will be able to make its normal routing update procedures in the PS domain and the timer resetting of FIG. 3/block 312 would not be necessary. Otherwise the UE might lose its page-ability for both CS and PS domains, which is prevented by the FIG. 3/block 312 timer reset procedure.

This fifth embodiment is summarized at block 314; the resetting of the routing area update RAU timer T3312 as stated in block 312 is conditional according to block 314 on a value of time remaining in the packet-switched domain back-off timer T3346 exceeding the value of time remaining in the tracking area update TAU timer T3412.

Embodiments of these teachings provide the technical effect that the UE's MM layer does not need listen to EMM layer specific (PS domain specific) timer T3412, but can use existing procedures. Further, for the first through third embodiments, once the timer T3212 is initiated with a suitable value, the existing/conventional location update procedure is re-used completely as it now stands in the reference specification, so adoption into existing infrastructure is quite straightforward. Handling of timer T3212 will already cover all known cases where periodic location update is needed. And as noted above, there is no need for additional "just in case" location update signaling apart from the timer for the UE to remain page-able. Timer T3212 is set to a value that will trigger a periodic location update at the latest point in time when it is still safe to do so, without the UE losing pageability. The similar result is obtained by the other two embodiments which reset the RAU timer T3312.

The logic diagram of FIG. 3 may be considered to illustrate the operation of a method, and a result of execution of a computer program stored in a computer readable memory, and a specific manner in which components of an electronic wireless radio device are configured to cause that electronic device to operate, whether such an electronic device is the NB/access node of some inter-RAT network (including remote radio heads and relays), or one or more components thereof such as a modem, chipset, or the like; or whether it is the UE or one or more components thereof. The various blocks shown in FIG. 3 may also be considered as a plurality of coupled logic circuit elements constructed to carry out the associated function(s), or specific result of strings of computer program code or instructions stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may include circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a network access node/eNB/NB or a UE, to perform the various functions summarized at FIG. 3 and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" also covers, for example, a baseband integrated circuit or applications processor integrated circuit for a network access node/eNB/NB or for a UE, or a similar integrated circuit in a server or other network device or user equipment which operates according to these teachings.

Figure 4:
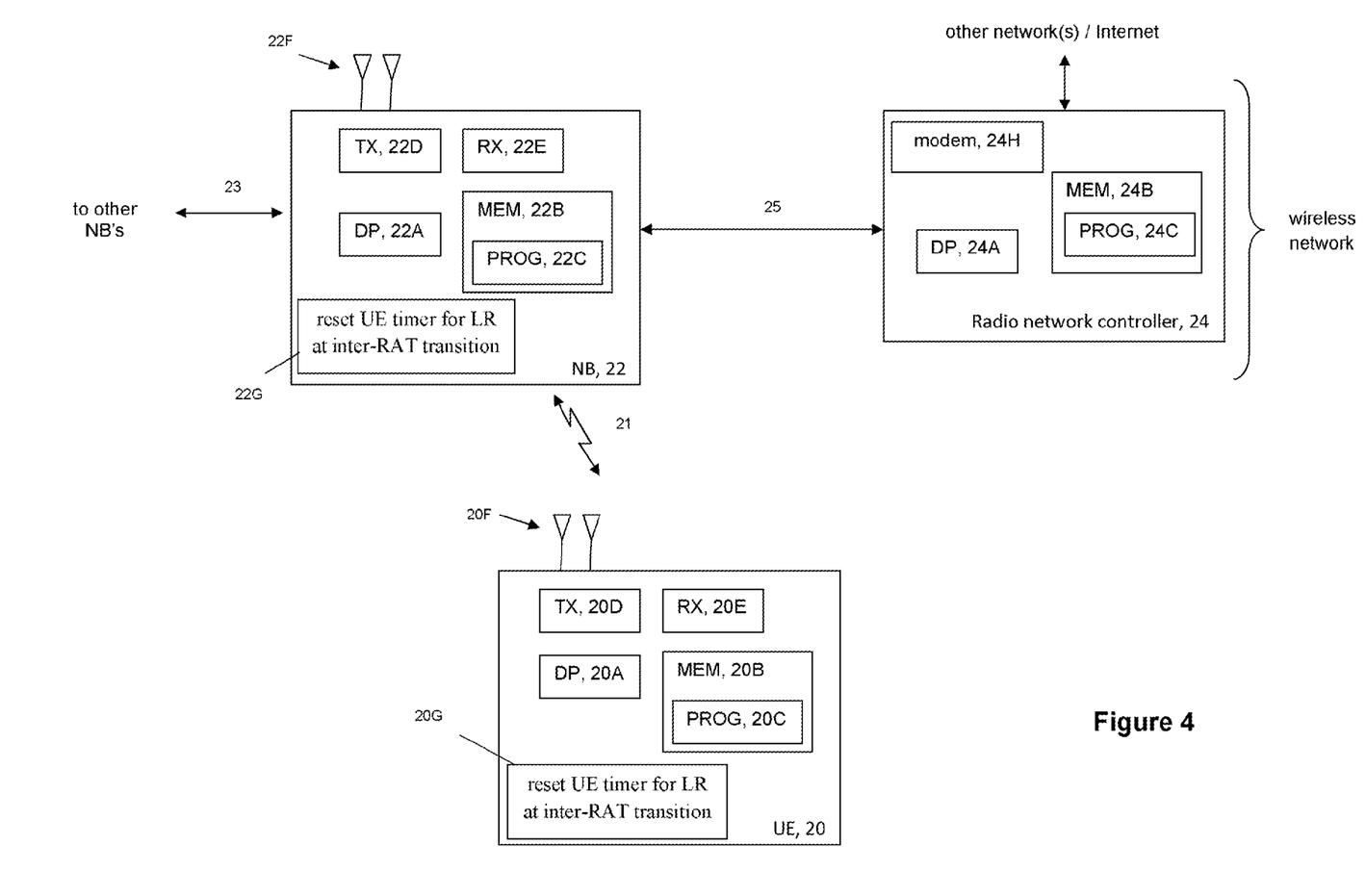
FIG. 4 is a simplified block diagram of a UE and a NB which are exemplary electronic devices suitable for use in practicing the exemplary embodiments of the invention, and FIG. 4 further shows a higher network node for context.

Reference is now made to FIG. 4 for illustrating a simplified block diagram of various electronic devices and apparatus that are suitable for use in practicing the exemplary embodiments of this invention. In FIG. 4 a NB 22 is adapted for communication over a wireless link 21 with an apparatus, such as a mobile terminal or UE 20. The NB 22 may be any access node (including frequency selective repeaters) of any wireless network, such as GERAN or UTRAN in the specific examples above or even LTE, LTE-A, GSM, WCDMA, and the like in other implementations using other specific timers or the same ones from the above examples. The operator network of which the NB 22 is a part may also include a higher network control element such as a radio network controller 24, or a mobility management entity MME and/or serving gateway SGW 24, any of which provides connectivity with further networks (e.g., a publicly switched telephone network PSTN and/or a data communications network/Internet).

The UE 20 includes processing means such as at least one data processor (DP) 20A, storing means such as at least one computer-readable memory (MEM) 20B that tangibly stores at least one computer program (PROG) 20C which is also termed a set of computer executable instructions, and communicating means such as a transmitter TX 20D and a receiver RX 20E for bidirectional wireless communications with the NB 22 via one or more antennas 20F. Also stored in the MEM 20B at reference number 20G are the algorithms or computer code which controls the UE 20 to reset its timer for a location registration/update as detailed in the various exemplary embodiments above.

The NB 22 also includes processing means such as at least one data processor (DP) 22A, storing means such as at least one computer-readable memory (MEM) 22B that tangibly stores at least one computer program (PROG) 22C, and communicating means such as a transmitter TX 22D and a receiver RX 22E for bidirectional wireless communications with the UE 20 via one or more antennas 22F. The NB 22 stores at block 22G similar algorithms/computer code for controlling the NB 22 to reset its own UE-specific timer for a location registration/update as detailed in the various exemplary embodiments above, similar as detailed above for the UE at block 20G. The NB 22 may further have a data/control link 23 with other NBs and/or with inter-RAT access nodes such as the eNB in the above examples and shown at FIG. 2. Such an eNB has similar functions as shown at FIG. 4 for the NB 22.

For completeness, the higher network node/RNC 24 is shown at FIG. 4 to include processing means such as at least one data processor (DP) 24A, storing means such as at least one computer-readable memory (MEM) 24B that tangibly stores at least one computer program (PROG) 24C, and communicating means such as a modem 24H for bidirectional data and control communications with the NB 22 via the data/control link 25.

While not particularly illustrated for the UE 20 or NB 22, those devices are also assumed to include as part of their wireless communicating means a modem and/or a chipset which may or may not be inbuilt onto an RF front end chip within those devices 20, 22 and which also operates utilizing rules for resetting the UE timer as set forth in detail above.

At least one of the PROGs 20C in the UE 20 is assumed to include a set of program instructions that, when executed by the associated DP 20A, enable the device to operate in accordance with the exemplary embodiments of this invention, as detailed above. The NB 22 also has software stored in its MEM 22B to implement certain aspects of these teachings such as those specifically summarized at FIG. 3. In these regards the exemplary embodiments of this invention may be implemented at least in part by computer software stored on the MEM 20B, 22B which is executable by the DP 20A of the UE 20 and/or by the DP 22A of the NB 22, or by hardware, or by a combination of tangibly stored software and hardware (and tangibly stored firmware). Electronic devices implementing these aspects of the invention need not be the entire devices as depicted at FIG. 4 but may be one or more components of same such as the above described tangibly stored software, hardware, firmware and DP, or a system on a chip SOC or an application specific integrated circuit ASIC or modem.

In general, the various embodiments of the UE 20 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEMs 20B, 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the GERAN/UTRAN and LTE/LTE-A systems, as noted above the exemplary embodiments of this invention are not limited for use with only this one particular type of wireless communication system.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method for controlling a wireless radio device, the method comprising:
   determining that a user equipment is transitioning from a cell in a first radio access technology to a cell in a second radio access technology; and
   at the transition, resetting a timer for controlling when the user equipment is to send a periodic location registration,
   wherein the timer is a location update timer T3212 and is set or reset at the transition based on a value of time remaining in a periodic tracking area update timer T3412 for the user equipment.

2. The method according to claim 1, wherein the first radio access technology is E-UTRAN, the second radio access technology is UTRAN or GERAN, and the user equipment is in circuit-switched/packet-switched modes 1 or 2.

3. The method according to claim 1, wherein resetting the timer is conditional on a periodic routing area update procedure being blocked for the user equipment in a packet-switched domain.

4. The method according to claim 1, wherein resetting the location update timer T3212 is conditional on a value of time remaining in a packet-switched domain backoff timer T3346 exceeding the value of time remaining in the tracking area update timer T3412.

5. The method according to claim 1, wherein the method is performed by the user equipment which is the wireless radio device, and the method further comprises:
   prior to expiry of the reset timer, sending from the user equipment to the cell in the second radio access technology a periodic location registration.

6. The method according to claim 1, wherein the method is performed by an access node controlling the cell in the second radio access technology and the access node is the wireless radio device, and the method further comprises:
   prior to expiry of the reset timer, receiving at the access node from the user equipment a periodic location registration.

7. An apparatus for controlling a wireless radio device, the apparatus comprising:
   a processing system;
   and at least one memory including computer program code;
   the at least one memory and the computer program code being configured to, with processing system, cause the apparatus at least to:
      determine that a user equipment is transitioning from a cell in a first radio access technology to a cell in a second radio access technology; and
      at the transition, reset a timer for controlling when the user equipment is to send a periodic location registration,
      wherein the timer is a location update timer T3212 and is set or reset at the transition based on a value of time remaining in a periodic tracking area update timer T3412 for the user equipment.

8. The apparatus according to claim 7, wherein the first radio access technology is E-UTRAN, the second radio access technology is UTRAN or GERAN, and the user equipment is in circuit-switched/packet-switched modes 1 or 2.

9. The apparatus according to claim 7, wherein resetting the timer is conditional on a periodic routing area update procedure being blocked for the user equipment in a packet-switched domain.

10. The apparatus according to claim 7, wherein the processing system is arranged to reset the location update timer T3212 conditional on a value of time remaining in a packet-switched domain backoff timer T3346 exceeding the value of time remaining in the tracking area update timer T3412.

11. The apparatus according to claim 7, wherein the apparatus comprises the user equipment which is the wireless radio device, and the processing system is configured to cause the user equipment further to:
   prior to expiry of the reset timer, send to the cell in the second radio access technology a periodic location registration.

12. The apparatus according to claim 7, wherein the apparatus comprises an access node controlling the cell in the second radio access technology and the access node is the wireless radio device, and the processing system is configured to cause the access node further to:
   prior to expiry of the reset timer, receive from the user equipment a periodic location registration.

13. A non-transitory computer-readable storage medium comprising a set of computer-readable instructions stored thereon, which, when executed by an apparatus, causes the apparatus to perform the steps of:
   determining that a user equipment is transitioning from a cell in a first radio access technology to a cell in a second radio access technology; and
   resetting, at the transition, a timer for controlling when the user equipment is to send a periodic location registration,
   wherein the timer is a location update timer T3212 and is set or reset at the transition based on a value of time remaining in a periodic tracking area update timer T3412 for the user equipment.

14. The non-transitory computer-readable storage medium according to claim 13, wherein the first radio access technology is E-UTRAN, the second radio access technology is UTRAN or GERAN, and the user equipment is in circuit-switched/packet-switched modes 1 or 2.

15. The non-transitory computer-readable storage medium according to claim 13, wherein the set of instructions for resetting the timer is executed conditional on a periodic routing area update procedure being blocked for the user equipment in a packet-switched domain.

16. The non-transitory computer-readable storage medium according to claim 13, wherein the set of instructions for resetting the location update timer T3212 is executed conditional on a value of time remaining in a packet-switched domain backoff timer T3346 exceeding the value of time remaining in the tracking area update timer T3412.

17. The non-transitory computer-readable storage medium according to claim 13, wherein the wireless radio device comprises the user equipment, and the set of instructions, when executed by the apparatus, further causes the apparatus to perform the step of:

sending from the user equipment to the cell in the second radio access technology a periodic location registration, prior to expiry of the reset timer.

18. The non-transitory computer-readable storage medium according to claim 13, wherein the wireless radio device comprises an access node controlling the cell in the second radio access technology, and the set of instructions, when executed by the apparatus, further causes the apparatus to perform the step of:

receiving from the user equipment a periodic location registration prior to expiry of the reset timer.

\* \* \* \* \*